United States Patent
Chen et al.

(10) Patent No.: US 10,915,464 B2
(45) Date of Patent: Feb. 9, 2021

(54) SECURITY SYSTEM USING RANDOM NUMBER BIT STRING

(71) Applicant: eMemory Technology Inc., Hsin-Chu (TW)

(72) Inventors: Hsin-Ming Chen, Hsinchu (TW); Meng-Yi Wu, Hsinchu County (TW); Po-Hao Huang, Hsinchu (TW)

(73) Assignee: eMemory Technology Inc., Hsin-Chu (TW)

(*) Notice: Subject to any disclaimer, the term of this patent is extended or adjusted under 35 U.S.C. 154(b) by 270 days.

(21) Appl. No.: 16/127,219

(22) Filed: Sep. 10, 2018

(65) Prior Publication Data
US 2019/0079878 A1    Mar. 14, 2019

Related U.S. Application Data

(60) Provisional application No. 62/557,170, filed on Sep. 12, 2017.

(30) Foreign Application Priority Data

Sep. 7, 2018 (TW) .............................. 107131405 A (51) Int. Cl.
*G06F 12/14* (2006.01)
*G06F 21/72* (2013.01)
(Continued)

(52) U.S. Cl.
CPC ........ *G06F 12/1408* (2013.01); *G06F 21/602* (2013.01); *G06F 21/72* (2013.01);
(Continued)

(58) Field of Classification Search
CPC ..... H03K 19/003; G11C 11/22; H03M 13/45; G06F 21/75; G06F 12/1408;
(Continued)

(56) References Cited

U.S. PATENT DOCUMENTS 5,396,471 A * 3/1995 Kitsu ................ G11C 8/20
  365/230.01
5,541,996 A * 7/1996 Ridenour .............. H04L 9/0662
  331/78

(Continued)

FOREIGN PATENT DOCUMENTS

| TW | 201727657 A | 8/2017 |
| WO | 2013/101085 A1 | 7/2013 |
| WO | 2016/102164 A1 | 6/2016 |

*Primary Examiner* — Thanhnga B Truong
(74) *Attorney, Agent, or Firm* — Winston Hsu (57) ABSTRACT

A security system includes a physical unclonable function circuit, a write-in protection circuit, a memory, and a readout decryption circuit. The physical unclonable function circuit provides a plurality of random bit strings. The write-in protection circuit receives a write-in address and original data, and includes an address scrambling unit. The address scrambling unit generates a scrambled address by scrambling a write-in address according to a random bit string provided by the physical unclonable function circuit. The memory stores the storage data corresponding to the original data according to the scrambled address. The readout decryption circuit reads out the storage data from the memory according to the write-in address to derive the original data.

22 Claims, 5 Drawing Sheets

(51) Int. Cl.
  *G06F 21/75* (2013.01)
  *H01L 27/112* (2006.01)
  *H04L 9/00* (2006.01)
  *G06F 21/60* (2013.01)
  *H04L 9/08* (2006.01)

(52) U.S. Cl.
  CPC ........ *G06F 21/75* (2013.01); *H01L 27/11206* (2013.01); *H04L 9/002* (2013.01); *H04L 9/0866* (2013.01); *H04L 9/0894* (2013.01); *H04L 2209/12* (2013.01)

(58) Field of Classification Search
  CPC ........ G06F 21/602; G06F 12/14; G06F 21/60; G06F 21/72; H01L 27/11206; H01L 27/112; H04L 9/0866; H04L 9/00; H04L 9/002; H04L 9/0894
  See application file for complete search history.

(56) References Cited

U.S. PATENT DOCUMENTS

| | | | |
|---|---|---|---|
| 8,713,330 B1* | 4/2014 | Sommer | G06F 11/1048 713/193 |
| 9,304,944 B2* | 4/2016 | Pong | G06F 12/1441 |
| 9,613,714 B1 | 4/2017 | Wong | |
| 2010/0251076 A1* | 9/2010 | Wu | H03M 13/6516 714/773 |
| 2014/0091832 A1* | 4/2014 | Gotze | H03K 19/003 326/8 |

* cited by examiner

SECURITY SYSTEM USING RANDOM NUMBER BIT STRING

BACKGROUND OF THE INVENTION

1. Field of the Invention

The present invention is related to a security system, and more particularly, to a security system using random bit string to improve data safety.

2. Description of the Prior Art

As electronic devices are applied to more and more fields, the information processed by the electronic devices also becomes more diverse. Sometimes electronic devices have to process sensitive information. In this case, the unique security keys in the electronic devices will be used as identification for protecting information safety. However, as reverse engineering methods for chips and devices have been automated, physical and side channel attacks have become more powerful and affordable. Therefore, the issue of exposure to sensitive information has raised concerns.

To prevent electronic devices from being accessed by unauthorized people, manufacturers of electronic devices often need to invest a significant amount of time and money to develop anti-measurement techniques to protect them against external threats. In the prior art, due to the nature of the integrated circuit (IC) of the physical unclonable function (PUF), the PUF circuit is often applied to protect the system from physical attacks and avoid reverse engineering, imposing obstacles for hacking the system.

The PUF circuits can generate unique bit strings based on random physical characteristics which are uncontrollably originated from the manufacturing process. Variations caused by the manufacturing process may result from minimal variations in process operation, material content, and/or environmental parameter shifts. These unavoidable and unpredictable variations are amplified by PUF circuit, resulting in unique bit strings.

Although the PUF circuit can produce unpredictable random numbers or security keys, these confidential information needs to be stored in the system continuously. That is, the random numbers or security keys are often stored in the non-volatile memory. In this case, if the random numbers or the security keys are stored in the memory in the traditional way, the adversary can obtain the information through the side channel attack or other hacking methods after obtaining the memory, threatening the information security of the entire system.

SUMMARY OF THE INVENTION

One embodiment of the present invention discloses a security system. The security system includes a physical unclonable function (PUF) circuit, a write-in protection circuit, a memory, and a readout decryption circuit.

The PUF circuit provides a plurality of random bit strings. The write-in protection circuit receives a write-in address and original data. The write-in protection circuit includes an address scrambling unit for generating a scrambled address by scrambling the write-in address according to a random bit string provided by the PUF circuit. The memory is coupled to the write-in protection circuit, and the memory stores the storage data corresponding to the original data according to the scrambled address. The readout decryption circuit is coupled to the memory, and reads out the storage data from the memory according to the write-in address to derive the original data.

Another embodiment of the present invention discloses a method for operating a security system. The security system includes a write-in protection circuit, a memory, a physical unclonable function (PUF) circuit, and a readout decryption circuit.

The method includes the PUF circuit providing a plurality of random bit strings to generate a first random bit string, the write-in protection circuit receiving a write-in address and original data, the write-in protection circuit generating a scrambled address by scrambling the write-in address according to the random bit string, the memory storing storage data corresponding to the original data according to the scrambled address, and the readout decryption circuit reading out the storage data from the memory according to the write-in address to derive the original data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
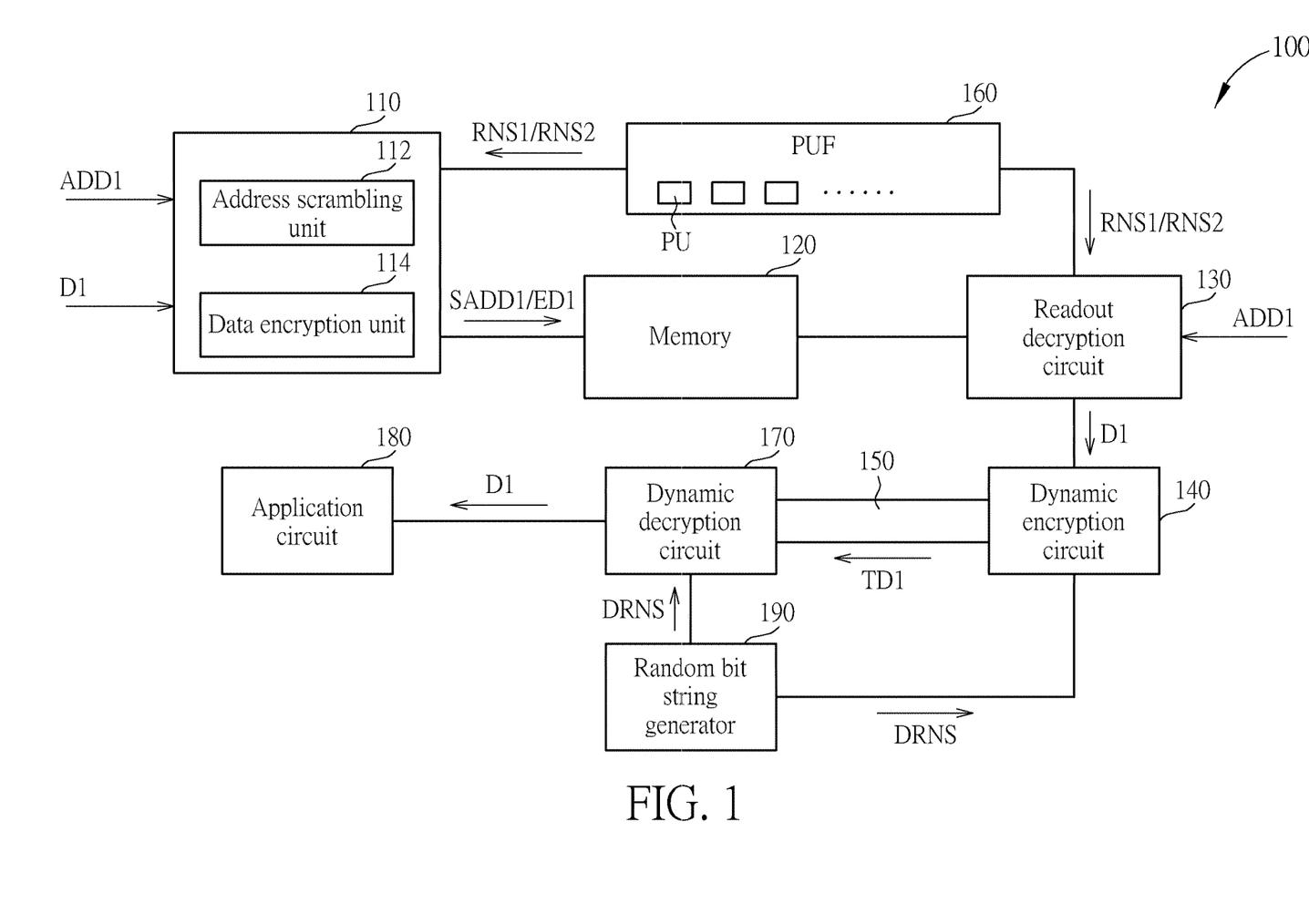
FIG. 1 shows a security system according to one embodiment of the present invention.

FIG. 1 shows a security system 100 according to one embodiment of the present invention. The security system 100 includes a protection circuit 110, a memory 120, and a readout decryption circuit 130. The memory 120 can be coupled to the protection circuit 110 and the readout decryption circuit 130.

In some embodiments, the memory 120 can be a one-time programmable memory. To protect the information stored in the memory 120 from being accessed by adversaries, the security system 100 can encrypt the data stored in the memory 120 and modify the write-in address with the write-in protection circuit 110. Consequently, without knowing how the write-in protection circuit 110 processes the encryption or which storing rule is applied, the adversary cannot identify the information stored in the memory 120. For example, even if the adversary retrieves each bit data stored in the memory 120 with reverse engineering, such as passive voltage contrast, the meaning of the retrieved data would still be incomprehensible since the data stored in the memory 120 is not the original data. Therefore, even if the data is accessed without authorization, it will not harm system security, and thus, the information safety of the memory 120 can be secured.

In FIG. 1, the write-in protection circuit 110 can include an address scrambling unit 112 and a data encryption unit 114. In some embodiments, when the security system 100 needs to store original data D1 to the memory space corresponding to the write-in address ADD1, the security system can send the original data D1 and the write-in address ADD1 to the write-in protection circuit 110. After receiving the original data D1 and the write-in address ADD1, the write-in protection circuit 110 can use the address scrambling unit 112 to scramble the write-in address ADD1 according to a random bit string RNS1 to generate a scrambled address SADD1, and can use the data encryption unit 114 to encrypt the original data according to a random bit string RNS2 to generate the storage data ED1. Afterwards, the memory 120 can store the storage data ED1 corresponding to the original data D1 according to the scrambled address SADD1.

That is, without knowing how the address scrambling unit 112 scrambles the address, the adversaries would not be able to retrieve the storage data ED1 according to the write-in address ADD1. Also, without knowing how the data encryption unit 114 encrypts the data, the adversaries would not be able the restore the original data D1 from the storage data ED1. Since it can be very difficult for the adversaries to figure out the corresponding relation between the address and the data or to reveal the original data actually used by the system from the stolen data, the security system 100 can improve the information security efficiently. In some embodiments, if the address scrambling unit 112 is enough to protect the information security of the memory 120, the designer may omit the data encryption unit 114. In this case, the storage data ED1 can have the same content as the original data.

In some embodiments, the address scrambling unit 112 can perform an exclusive OR computation on the random bit string RNS1 and the write-in address ADD1 to generate the scrambled address SADD1. For example, if the write-in address ADD1 is 01100100 and the random bit string is 10111101, then the scrambled address SADD1 generated by the address scrambling unit 112 can be the computation result of the XOR computation, that is 11011001. However, the present invention is not limited to using XOR computation to scramble the write-in address ADD1. In some other embodiments, the address scrambling unit 112 can use other reversible computation to scramble the write-in address ADD1.

In addition, to generate the storage data ED1, the data encryption unit 114 can modify the order of the original data D1, and modify the content of the original data D1 according to the random bit string RNS2. For example, if the content of the original data is 00011000, then the data encryption unit 114 can modify the order of the original data D1 first by switching the positions of every two bits of data, resulting in 00100100. Then, the content of original data can be modified by performing XOR computation with the random bit string RNS2 to generate the storage data ED1. Consequently, even if the adversary obtains the storage data ED1 from the memory 120, it would still be difficult to restore the original data D1 actually used by the system from the storage data ED1.

Furthermore, in some embodiments of the present invention, the data encryption unit 114 can modify the original data D1 according to the random bit string RNS2 first, and modify the order of the original data D1 later. Or, the data encryption unit 114 can modify only the order of the original data D1, and leave the content of the original data D1 unchanged. Or, the data encryption unit 114 can modify the content of the original data D1, and leave the order of the original data D1 unchanged.

In some embodiments, the data encryption unit 114 can scramble the order of the original data D1 in a fixed manner directly through the coupling relationship of the bit lines of the memory 120 when storing the original data. Or the data encryption unit 114 can determine the modifying order of the original data D1 according to another random bit string. In the latter case, the original data D1 can be further encrypted or stored in the memory 120 after the order of the original data D1 is modified. In addition, the data encryption unit 114 is not limited to performing XOR computation to modify the content of the original data D1 in the present invention. In some other embodiments, the data encryption unit 114 can also encrypt the original data D1 with other reversible computations.

After storing the storage data ED1 to the space corresponding to the scrambled address SADD1 in the memory 120, the readout decryption circuit 130 can read out the storage data ED1 according to the write-in address ADD1 to help to derive the original data D1. For example, the readout decryption circuit 130 can scramble the write-in address ADD1 in the same way as the address scrambling unit 112. Consequently, the readout decryption circuit 130 can generate the scrambled address SADD1 according to the random bit string RNS1 and the write-in address ADD1, and read out the storage data ED1. After the storage data ED1 has been read out, the readout decryption circuit 130 can further restore the original data D1 from the storage data ED1. That is, the readout circuit 130 can restore the content of the original data D1 according to the random bit string RNS2, and restore the order of the original data D1. In other words, although the memory 120 can store the encrypted storage data ED1 with the scrambled address to achieve the information security, the system can still derive the original data with the normal write-in address to fulfill the required operations.

In some embodiments, to ensure the scrambled address will not conflict with another write-in address after being scrambled and to ensure that the readout decryption circuit 130 can restore the original data D1 correctly, the random bit strings RNS1 and the RNS2 can be fixed bit strings that are invariant with time. That is, the write-in protection circuit 110 can scramble the write-in address with the fixed random bit string RNS1, and encrypt the original data D1 with the fixed random bit string RNS2. Also, the readout decryption circuit 130 will use the same random bit strings RNS1 and RNS2 to derive the original data D1 from the memory 120. In some embodiments, the random bit strings RNS1 and RNS2 can be substantially the same.

Figure 2:
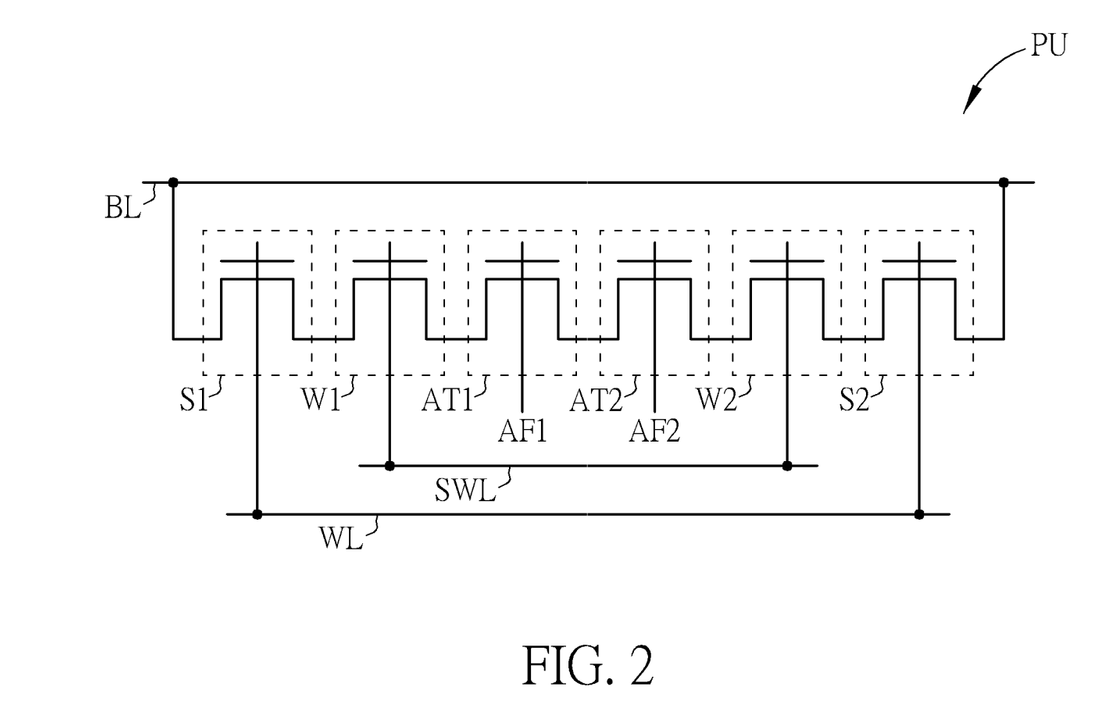
FIG. 2 shows a PUF unit of the PUF circuit in FIG. 1.

In FIG. 1, the security system 100 can further include a physical unclonable function (PUF) circuit 160. The PUF circuit 160 can provide a plurality of random bit strings to generate the random bit strings RNS1 and RNS2 required by the write-in protection circuit 110 and the readout decryption circuit 130. The PUF circuit 160 can include a plurality of PUF unit, and the PUF unit can be implemented by a one-time programmable memory structure. FIG. 2 shows a PUF unit PU of the PUF circuit 160. In FIG. 2, for example, the PUF unit PU can include select transistors S1 and S2, switch transistors W1 and W2, and anti-fuse transistors AT1 and AT2.

The select transistor S1 has a first terminal coupled to a bit line BL, a second terminal, and a control terminal coupled to a word line WL. The switch transistor W1 has a first terminal coupled to the second terminal of the select transistor S1, a second terminal, and a control terminal coupled to a switch control line SWL. The anti-fuse transistor AT1 has a first terminal coupled to the second terminal of the switch transistor W1, a second terminal, and a gate structure coupled to an anti-fuse control line AF1.

Also, the select transistor S2 has a first terminal coupled to the bit line BL, a second terminal, and a control terminal coupled to the word line WL. The switch transistor W1 has a first terminal coupled to the second terminal of the second select transistor S2, a second terminal, and a control terminal coupled to the switch control line SWL. The anti-fuse transistor AT2 has a first terminal coupled to the second terminal of the switch transistor W2, a second terminal coupled to the second terminal of the anti-fuse transistor AT1, and a gate structure coupled to a second anti-fuse control line AF2. That is, the anti-fuse transistors AT1 and AT2 can be coupled to each other, the switch transistors W1 and W2 can be controlled by the same switch control line SWL, and the select transistors S1 and S2 can be controlled by the same word line WL.

When the PUF unit PU performs the program operation, the gate structures of the anti-fuse transistors AT1 and AT2 will receive high voltages through the anti-fuse control lines AF1 and AF2, and the first terminals and second terminals (namely, the source terminals and the drain terminals) of the anti-fuse transistors AT1 and AT2 can receive low voltages through the switch transistors W1 and W2 and the select transistors S1 and S2. In this case, due to the structure variation on the anti-fuse transistors AT1 and AT2 caused during the manufacturing process, such as the variation of the gate oxide quality, the variation of the defect distribution, the variation of thickness of the gate oxide, the gate oxide of one of the anti-fuse transistors AT1 and AT2 will be ruptured first during the program operation. The ruptured anti-fuse transistor will couple a node between the anti-fuse transistors AT1 and AT2 to an intermediate voltage, and the voltage difference between the intermediate voltage and the high voltage received by the anti-fuse transistors AT1 and AT2 is not high enough to rupture the other anti-fuse transistor. That is, in a normal situation, there will be only one of the anti-fuse transistors AT1 and AT2 being ruptured during the program operation.

Therefore, after the program operation, the rupture conditions of the anti-fuse transistors AT1 and AT2 will distinguish these two. In this case, by applying the same reading voltages to the gate structures of the anti-fuse transistors AT1 and AT2, the currents will be generated and flow through the switch transistors W1 and W2 and the select transistors S1 and S2, and the currents can be read to interpret the rupture conditions. Since the rupture conditions of the anti-fuse transistors AT1 and AT2 are caused by uncontrollable manufacturing variation, the bit read from the PUF unit PU is unpredictable, and is suitable to be used as a random number bit. Therefore, the PUF circuit 160 can generate the required random bit strings by combining the bits read from the PUF units PU.

Figure 3:
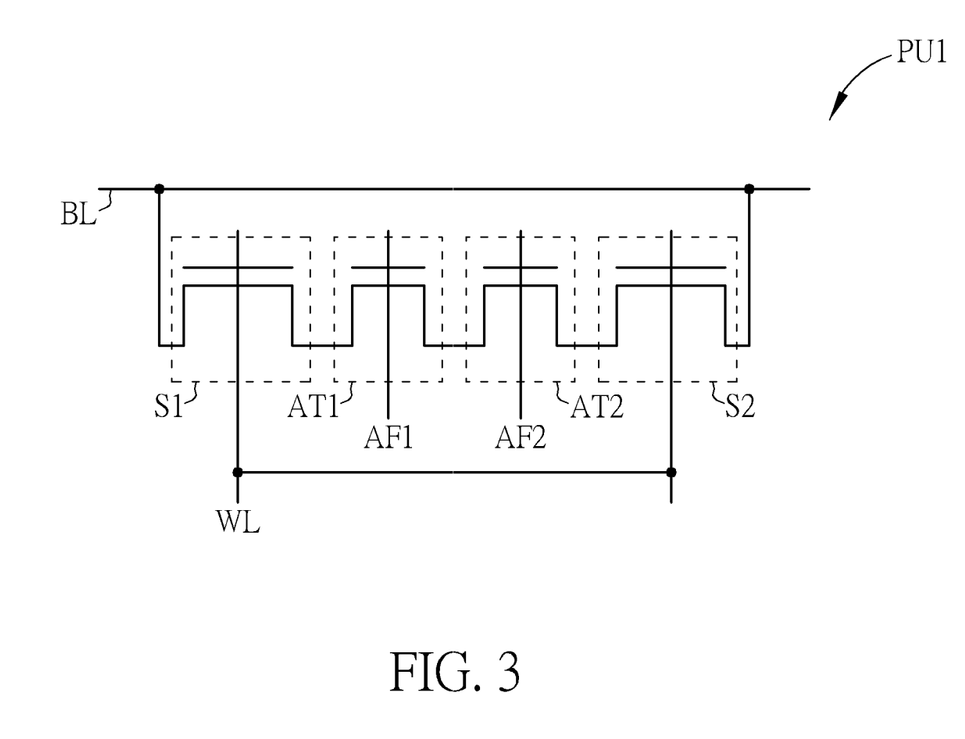
FIG. 3 shows a PUF unit according to another embodiment of the present invention.
Figure 4:
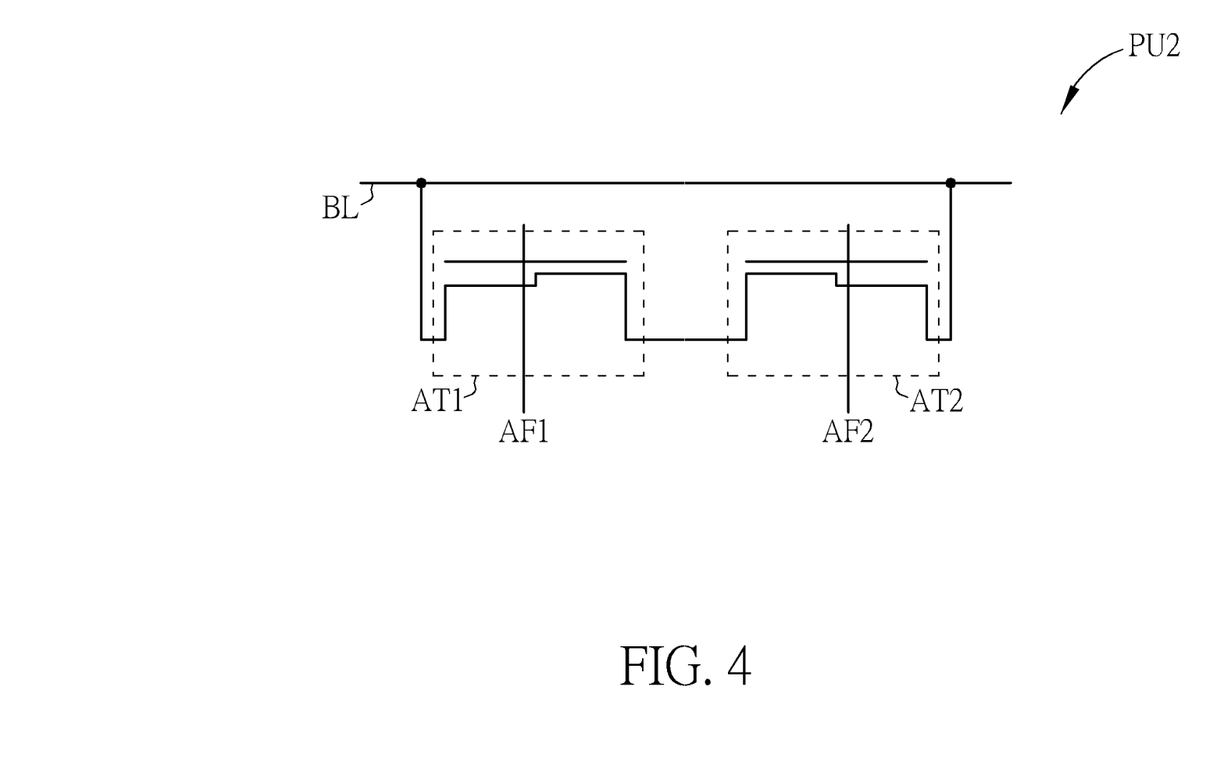
FIG. 4 shows a PUF unit according to another embodiment of the present invention.

In addition, the PUF unit shown in FIG. 2 is just one embodiment of the present invention. In some other embodiments, the PUF circuit 160 may be implemented by different structures. FIG. 3 and FIG. 4 show PUF units PU1 and PU2 according to two embodiments of the present invention. The difference between the PUF unit PU1 in FIG. 3 and the PUF unit PU in FIG. 2 is in that the PUF unit PU1 can omit the switch transistors W1 and W2. That is, the PUF unit PU1 can only include the select transistors S1 and S2, and the anti-fuse transistors AT1 and AT2. In this case, the first terminals of the select transistors S1 and S2 can be directly coupled to the bit line BL, and the remaining connection structure would be the same as the PUF unit PU as shown in FIG. 2.

Also, the PUF unit PU can be implemented by the structure shown in FIG. 4. In FIG. 4, the PUF unit PU2 can further omit the select transistors S1 and S2, and include only the anti-fuse transistors AT1 and AT2. In this case, the first terminals of the anti-fuse transistors AT1 and AT2 can be used to select and control the operations, and the second terminals of the anti-fuse transistors AT1 and AT2 may be ruptured during the program operation. Consequently, the select transistors S1 and S2 can be omitted while the function of the PUF unit can still be fulfilled.

In some embodiments, the write-in protection circuit 110, the memory 120, and the PUF circuit 160 can be integrated in a same circuit so that the information stored in the memory 120 can be protected even more securely from adversary's reach. Furthermore, when the security system 100 is built on one chip, since the random bit strings generated by the PUF circuit 160 are unique, the each of the PUF circuits 160 on a chip will also generated different random bit strings. That is, each of the write-in protection circuits 110 on a chip will encrypt the data differently. Therefore, since all the chips are encrypted differently, it would be very difficult and very costly to hack each chip.

In addition, the elements of the security system 100 can be disposed in different chips, and elements in different chips may communicate with each other through transmission buses. To prevent the adversaries from hacking information through the transmission buses, the security system 100 can further include a dynamic encryption circuit 140. In FIG. 1, the dynamic encryption circuit 140 can be coupled to the readout decryption circuit 130 and the data transmission bus 150. Before the original data D1 is transmitted to the transmission bus 150, the security system 100 can have the dynamic encryption circuit 140 to process the original data D1. The dynamic encryption circuit 140 can encrypt the original data D1 according to a dynamic random bit string DRNS to generate transmission data TD1, and send the transmission data TD1 to the transmission bus 150. Consequently, even if the adversary obtains the transmission data TD1 from the transmission bus 150 by skimming or other means of hacking, it is difficult to identify the original data D1 that the system actually wants to transmit.

In FIG. 1, the security system 100 can further include a dynamic decryption circuit 170 and an application circuit 180. The dynamic decryption circuit 170 can be coupled to the transmission bus 150, and can receive the transmission data TD1. The dynamic decryption circuit 170 can restore the original data D1 from the transmission data TD1 according to the dynamic random bit string DRNS, allowing the application circuit 180 to perform the corresponding operations according to the original data D1.

Also, the security system 100 can further include a random bit string generator 190. The random bit string generator 190 can generate an updated dynamic random bit string DRNS whenever the application circuit 180 requests for the original data D1, and the random bit string generator 190 can send the updated dynamic random bit string DRNS to the dynamic decryption circuit 170. That is, every time when the transmission bus 150 is used to transmit information, the dynamic encryption circuit 140 will use a different dynamic random bit string DRNS to encrypt the data to be transmitted, and the dynamic decryption circuit 170 can decrypt the transmission data TD1 according to the corresponding dynamic random bit string DRNS. Consequently, the possibility that the adversaries hack the encryption procedure of the security system 100 or crack the random bit string by observing the information on the transmission bus 150 for a long time can be reduced, allowing the security system 100 to protect the sensitive information therein more effectively.

In addition, the random bit string generator 190 can be implemented by many different ways, including the true random number generator implemented by hardware, the deterministic random bit generator implemented by software, and the hybrid random number generator implemented by both hardware and software. For example, the hybrid random number generator can be implemented by combining the deterministic random bit generator and the PUF circuit. In this case, the PUF circuit can provide an updated seed required by deterministic random bit generator once in a while, enhancing the randomness of the hybrid random number generator.

Furthermore, in some embodiments, the write-in protection circuit 110, the memory 120, the readout decryption circuit 130, and the dynamic encryption circuit 140 can be disposed in the same chip or in the same hardware macro while the dynamic decryption circuit 170, the application circuit 180, and the random bit string generator 190 can be disposed in another chip or in another hardware macro. In this case, the write-in protection circuit 110 can protect the data stored in the memory 120, and the dynamic encryption circuit 140 can protect the data transmitted through the transmission bus 150.

In the embodiment shown in FIG. 1, the random bit strings RNS1 and RNS2 can be provided by the PUF circuit 160. However, in some other embodiments, the random bit strings RNS1 and RNS2 can be generated by the random bit string generator 190. In addition, in some embodiments, the dynamic random bit string DRNS, the random bit strings RNS1 and RNS2 can be provided by external circuits.

Figure 5:
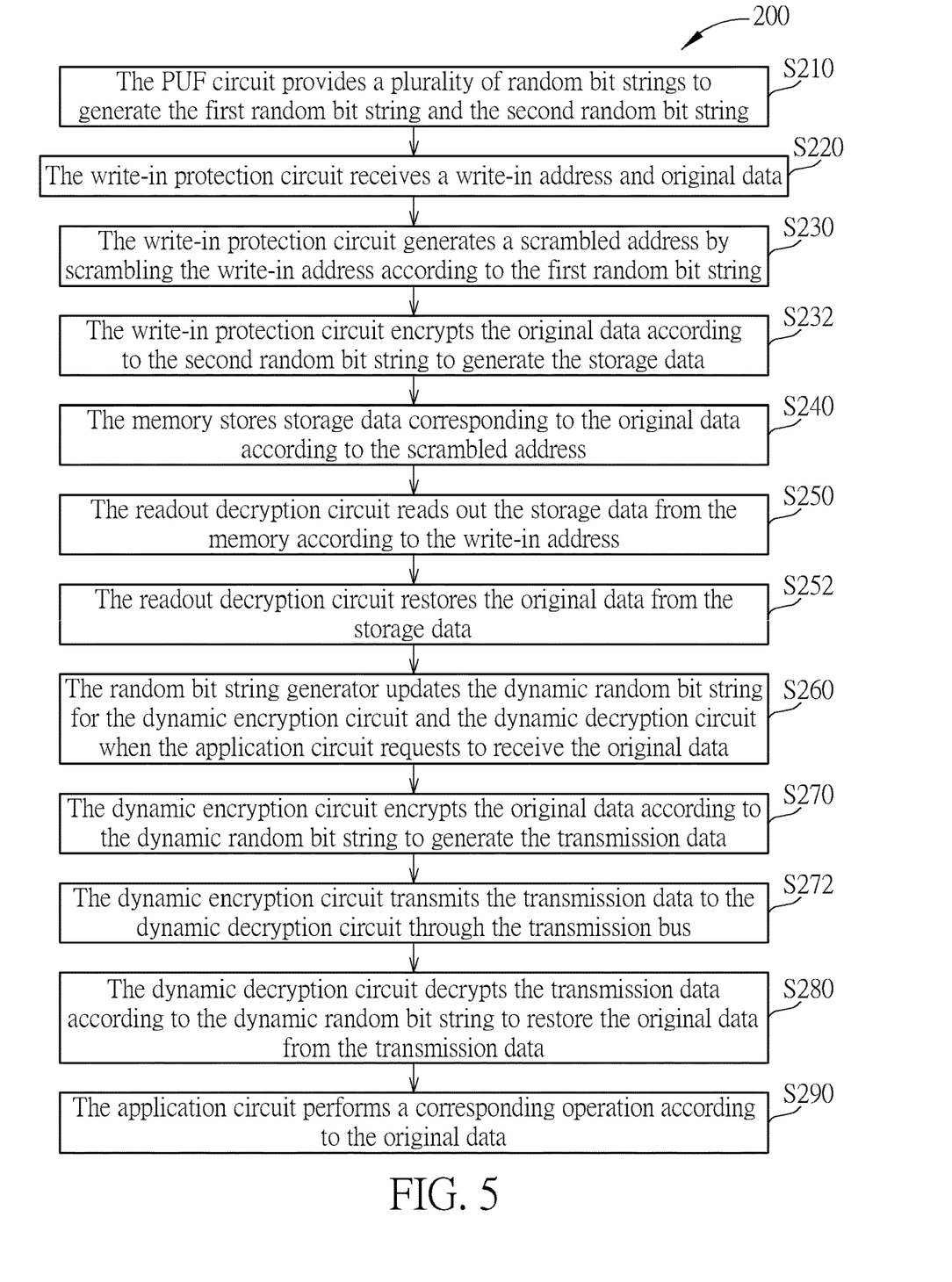
FIG. 5 shows a flow chart of a method for operating the security system in FIG. 1 according to one embodiment of the present invention.

FIG. 5 shows a flow chart of a method 200 for operating the security system 100 according to one embodiment of the present invention. The method 200 includes steps S210 to S290, but is limited to the order shown in FIG. 5.

S210: the PUF circuit 160 provides a plurality of random bit strings to generate the first random bit string RNS1 and the second random bit string RNS2;

S220: the write-in protection circuit 110 receives a write-in address ADD1 and original data D1;

S230: the write-in protection circuit 110 generates a scrambled address SADD1 by scrambling the write-in address ADD1 according to the first random bit string RNS1;

S232: the write-in protection circuit 110 encrypts the original data D1 according to the second random bit string RNS2 to generate the storage data ED1;

S240: the memory 120 stores storage data ED1 corresponding to the original data D1 according to the scrambled address SADD1

S250: the readout decryption circuit 130 reads out the storage data ED1 from the memory 120 according to the write-in address ADD1;

S252: the readout decryption circuit 130 restores the original data D1 from the storage data ED1;

S260: the random bit string generator 190 updates the dynamic random bit string DRNS for the dynamic encryption circuit 140 and the dynamic decryption circuit 170 when the application circuit 180 requests to receive the original data D1;

S270: the dynamic encryption circuit 140 encrypts the original data D1 according to the dynamic random bit string DRNS to generate the transmission data TD1;

S272: the dynamic encryption circuit 140 transmits the transmission data TD1 to the dynamic decryption circuit 170 through the transmission bus 150;

S280: the dynamic decryption circuit 170 decrypts the transmission data TD1 according to the dynamic random bit string DRNS to restore the original data D1 from the transmission data TD1; and S290: the application circuit 180 performs a corresponding operation according to the original data D1.

In step S230, the write-in protection circuit 110 can generate the scrambled address SADD1 by, for example but not limited to, performing an exclusive OR computation on the write-in address ADD1 and the random bit string RNS1. In some other embodiments, the write-in protection circuit 110 can generate scrambled address SADD1 by entangling the write-in address ADD1 and the random bit string RNS1 with some other computations.

In addition, in step S232, the write-in protection circuit 110 can modify the order of the original data D1, and modify the content of the original data D1 according to the random bit string RNS2. For example but not limited to, the write-in protection circuit 110 can perform the exclusive OR computation on the random bit string RNS2 and the original data D1 to generate the storage data ED1. In some embodiments, the write-in protection circuit 110 can entangle the random bit string RNS2 and the original data D1 by other kinds of computations, and can modify the order of the original data D1 with other random bit strings.

In FIG. 1, the write-in protection circuit 110 can use different units to perform steps S230 and S232; therefore, steps S230 and S232 are not limited to being performed in a specific order, but can be performed in parallel in some embodiments.

With steps S230 and S232, the memory 120 can store the storage data ED1 according to the scrambled address SADD1, making it difficult for the adversaries to obtain the actual original data D1 used in the system from the memory 120.

Also, when the security system 100 needs to retrieve the original data D1 from the memory 120, the readout decryption circuit 130 would read out the storage data ED1 from the memory 120 and restore the original data D1 from the storage data ED1 in steps S250 and 252. For example, the readout decryption circuit 130 can derive the original data D1 by decrypting the storage data ED1 according to the random bit string RNS2 and restoring the order of the original data D1. That is, the readout decryption circuit 130 can perform the decryption to restore the original data D1 according to the encryption method used by the write-in protection circuit 110. In some embodiments, if the security system 100 protects the data stored in the memory 120 simply by scrambling the addresses without encrypting the content of the data, then step S232 may be omitted in the method 200. In this case, the storage data ED1 stored in the memory 120 in step S240 may be the same as the original data D1, and the readout decryption circuit 130 may omit step S252.

In some embodiments, the random bit strings RNS1 and RNS2 can be fixed bit strings that are invariant with time, so that the write-in protection circuit 110 and the readout decryption circuit 130 can protect the information stored in the memory 120 without causing confliction in the storing space of the memory 120 by scrambling the address.

Furthermore, with steps S260 to S280, the method 200 can protect the original data D1 from being hacked by adversaries during the transmission in the transmission bus 150. Also, since step S260 can update the dynamic random bit string DRNS for each data transmission, the protection for transmission data can be further improved, preventing the encryption scheme and the content of the dynamic random bit string from being revealed by the adversaries.

In summary, the security systems and the methods for operating the security system provided by the embodiments of the present invention can protect the information stored in the memory effectively. Also, the process of data transmission can be protected with dynamic encryption, making it difficult to obtain or hack the information in the security system and improving information security.

The above are only the preferred embodiments of the present invention, and all changes and modifications made in accordance with the scope of the present invention should be covered by the present invention.

What is claimed is:

1. A security system comprising:
a physical unclonable function (PUF) circuit configured to provide a plurality of random bit strings, the PUF circuit comprising a plurality of PUF units each comprising:
a first select transistor having a first terminal coupled to a bit line, a second terminal, and a control terminal coupled to a word line;
a first anti-fuse transistor having a first terminal coupled to the second terminal of the first select transistor, a second terminal, and a gate structure coupled to a first anti-fuse control line;
a second select transistor having a first terminal coupled to the bit line, a second terminal, and a control terminal coupled to the word line; and
a second anti-fuse transistor having a first terminal coupled to the second terminal of the second select transistor, a second terminal coupled to the second terminal of the first anti-fuse transistor, and a gate structure coupled to a second anti-fuse control line;
a write-in protection circuit configured to receive a write-in address and original data, and comprising an address scrambling unit configured to generate a scrambled address by scrambling the write-in address according to a first random bit string provided by the PUF circuit;
a memory coupled to the write-in protection circuit, and configured to store storage data corresponding to the original data according to the scrambled address; and
a readout decryption circuit coupled to the memory, and configured to read out the storage data from the memory according to the write-in address to derive the original data.

2. The security system of claim 1, wherein the write-in protection circuit further comprises a data encryption unit configured to encrypt the original data according to a second random bit string provided by the PUF circuit to generate the storage data corresponding to the original data.

3. The security system of claim 2, wherein the first random bit string is the same as the second random bit string.

4. The security system of claim 2, wherein the first random bit string and the second random bit string are fixed bit strings that are invariant with time.

5. The security system of claim 2, wherein the data encryption unit generates the storage data by modifying an order of the original data and modifying content of the original data according to the second random bit string.

6. The security system of claim 5, wherein the readout decryption circuit derives the original data by decrypting the storage data according to the second random bit string and restoring the order of the original data.

7. The security system of claim 1, further comprises a dynamic encryption circuit coupled to the readout decryption circuit and a transmission bus, and configured to encrypt the original data according to a dynamic random bit string to generate transmission data, and transmit the transmission data to the transmission bus.

8. The security system of claim 7, further comprising:
a dynamic decryption circuit coupled to the transmission bus, and configured to receive the transmission data and decrypt the transmission data according to the dynamic random bit string to restore the original data; and
an application circuit configured to perform a corresponding operation according to the original data.

9. The security system of claim 8, further comprising:
a random bit string generator configured to update the dynamic random bit string when the application circuit requests to receive the original data, and transmit an updated dynamic random bit string to the dynamic encryption circuit and the dynamic decryption circuit.

10. The security system of claim 1, wherein the address scrambling unit generates the scrambled address by performing an exclusive OR computation on the first random bit string and the write-in address.

11. A security system comprising:
a physical unclonable function (PUF) circuit configured to provide a plurality of random bit strings, the PUF circuit comprising a plurality of PUF units each comprising:
a first select transistor having a first terminal coupled to a bit line, a second terminal, and a control terminal coupled to a word line;
a first switch transistor having a first terminal coupled to the second terminal of the first select transistor, a second terminal, and a control terminal coupled to a switch control line;
a first anti-fuse transistor having a first terminal coupled to the second terminal of the first switch transistor, a second terminal, and a gate structure coupled to a first anti-fuse control line;
a second select transistor having a first terminal coupled to the bit line, a second terminal, and a control terminal coupled to the word line;
a second switch transistor having a first terminal coupled to the second terminal of the second select transistor, a second terminal, and a control terminal coupled to the switch control line; and
a second anti-fuse transistor having a first terminal coupled to the second terminal of the second switch transistor, a second terminal coupled to the second terminal of the first anti-fuse transistor, and a gate structure coupled to a second anti-fuse control line;
a write-in protection circuit configured to receive a write-in address and original data, and comprising an address scrambling unit configured to generate a scrambled address by scrambling the write-in address according to a first random bit string provided by the PUF circuit;
a memory coupled to the write-in protection circuit, and configured to store storage data corresponding to the original data according to the scrambled address; and
a readout decryption circuit coupled to the memory, and configured to read out the storage data from the memory according to the write-in address to derive the original data.

12. A security system comprising:
a physical unclonable function (PUF) circuit configured to provide a plurality of random bit strings, the PUF circuit comprising a plurality of PUF units each comprising:
a first anti-fuse transistor having a first terminal coupled to a bit line, a second terminal, and a gate structure coupled to a first anti-fuse control line; and a second anti-fuse transistor having a first terminal coupled to the bit line, a second terminal, and a gate structure coupled to a second anti-fuse control line;

a write-in protection circuit configured to receive a write-in address and original data, and comprising an address scrambling unit configured to generate a scrambled address by scrambling the write-in address according to a first random bit string provided by the PUF circuit;

a memory coupled to the write-in protection circuit, and configured to store storage data corresponding to the original data according to the scrambled address; and a readout decryption circuit coupled to the memory, and configured to read out the storage data from the memory according to the write-in address to derive the original data.

13. The security system of claim 12, wherein the the second terminal of the second anti-fuse transistor is coupled to the second terminal of the first anti-fuse transistor.

14. A method for operating a security system, the security system comprising a write-in protection circuit, a memory, a physical unclonable function (PUF) circuit, a dynamic encryption circuit, and a readout decryption circuit, the method comprising:

the PUF circuit providing a plurality of random bit strings to generate a first random bit string;

the write-in protection circuit receiving a write-in address and original data;

the write-in protection circuit generating a scrambled address by scrambling the write-in address according to the first random bit string;

the memory storing storage data corresponding to the original data according to the scrambled address;

the readout decryption circuit reading out the storage data from the memory according to the write-in address to derive the original data;

the dynamic encryption circuit encrypting the original data according to a dynamic random bit string to generate transmission data; and the dynamic encryption circuit transmitting the transmission data to a transmission bus.

15. The method of claim 14, further comprising the write-in protection circuit encrypting the original data according to a second random bit string generated by the PUF circuit to generate the storage data.

16. The method of claim 15, wherein the write-in protection circuit encrypting the original data according to the second random bit string generated by the PUF circuit to generate the storage data comprises:

the write-in protection circuit modifying an order of the original data; and the write-in protection circuit modifying content of the original data according to the second random bit string to generate the storage data.

17. The method of claim 16, wherein the readout decryption circuit reading out the storage data from the memory according to the write-in address to derive the original data comprises:

the readout decryption circuit decrypting the storage data according to the second random bit string; and the readout decryption circuit restoring the order of the original data.

18. The method of claim 15, wherein the first random bit string is the same as the second random bit string.

19. The method of claim 15, wherein the first random bit string and the second random bit string are fixed bit strings that are invariant with time.

20. The method of claim 14, wherein the write-in protection circuit generating the scrambled address by scrambling the write-in address according the first random bit string is the write-in protection circuit performing an exclusive OR computation on the first random bit string and the write-in address to generate the scrambled address.

21. The method of claim 14, wherein the security system further comprises a dynamic decryption circuit and an application circuit, and the method further comprises:

the dynamic decryption circuit decrypting the transmission data according to the dynamic random bit string to restore the original data; and the application circuit performing a corresponding operation according to the original data.

22. The method of claim 21, wherein the security system further comprises a random bit string generator, and the method further comprises:

the random bit string generator updating the dynamic random bit string when the application circuit requests to receive the original data; and the random bit string generator transmitting an updated dynamic random bit string to the dynamic encryption circuit and the dynamic decryption circuit.

* * * * *